April 28, 1970 R. E. NEARMAN 3,508,498

OVERRIDING DOG APPARATUS

Filed May 13, 1968

INVENTOR
RICHARD E. NEARMAN

*Littlepage, Quaintance & Wray*

ATTORNEYS

United States Patent Office 3,508,498
Patented Apr. 28, 1970

3,508,498
OVERRIDING DOG APPARATUS
Richard E. Nearman, Mount Airy, Md., assignor to Automated Handling Systems Inc., Washington, D.C., a corporation of the District of Columbia
Filed May 13, 1968, Ser. No. 728,511
Int. Cl. B65g 19/22; B61b 13/00
U.S. Cl. 104—172   8 Claims

ABSTRACT OF THE DISCLOSURE

Improved spring-mounted overriding pusher dogs for engaging and driving trolleys, for disengaging the trolleys and riding over adjacent trolleys without jamming trolleys together, and for engaging and moving leading trolleys from accumulations of trolleys are described herein for use with conveyors having independent load-carrying trolleys moving along tracks and having drive chains in parallel runs.

BACKGROUND

Free trolley and power driven chain conveyors or power and free conveyors have been described as trolley conveyors in which a drive chain propels loads but does not actually carry them. Power chain and free trolley conveyor systems, as known today, use conveyor chains to which pusher devices are attached at intervals. The pusher devices extend toward tracks which carry free trolleys. As the pushers engage trolleys they are propelled along the track until the pushers and trolleys are separated. Loads are carried independent of the main drive chain on trolleys which have bodies, sets of load supporting wheels and guide wheels to maintain the bodies spaced from vertical walls of tracks to prevent binding on turns. Free trolleys may be switched on and off main lines.

Power and free trolley conveyor systems present problems in disengaging trolleys from driving means when diverting trolleys on spur tracks and when collecting or accumulating several trolleys on main conveyor tracks. In conventional systems releasing trolleys requires the separating of trolley tracks from runs for chains having fixed or rigid type pusher dogs. The use of rigid pushers requires trolley tracks and chain runs to be accurately and uniformly juxtapositioned throughout the whole conveyor except where trolleys are to be released, since deviations between a chain run and trolley track disengages trolleys from pushers. Once a trolley is released, energy other than that from the driving chain is required to return the trolleys to the main line. Some systems employ spring operated arms or cams to separate pivoted pushers from trolleys, but spring operated pusher arms create pressure on all trolleys when they are accumulated in a line.

In copending application Ser. No. 708,723 filed Feb. 27, 1968, entitled Trolley Conveying Method and Apparatus by Lewis R. Catt and James M. McCullough, overriding dogs have been described and claimed.

Reciprocating pusher dogs of that invention permit the rapid and accurate engaging and disengaging of the trolleys and the drive chain. The pusher dogs when in a downward position engage upstanding lugs on the trolleys for driving the trolleys along the tracks; the disengaging of the dogs from the trolleys is effected by the lifting of the dog blocks from the trolley lugs. Lifting of the pusher dogs may be accomplished by cammed surfaces mounted on the tracks or by cammed trailing ends of stopped trolleys. Cooperating sloping surfaces on trailing ends of trolleys and leading ends of the dogs prevent jamming of trolleys by allowing the dogs to ride up and over accumulated trolleys. When a pusher dog which is pushing one trolley encounters a stopped trolley, the dog lifts over the stopped trolley. The pusher dog then engages the first trolley in a line of stopped trolleys and carries it on, after having passed over all intermediate trolleys in the line without jamming adjacent trolleys together. Such design makes possible the accumulation of trolleys in a track without creating any buildup of pressure on the stopped trolleys.

SUMMARY OF THE INVENTION

The overriding pusher dog of the present invention employs a single moving part, an integral pusher block, which may be attached to a pendant of a conveyor chain. Clips which limit upward and downward movement of the pusher dog are riveted to the pendant. A central opening in the integrally cast pusher dog is recessed to provide clearance for rivet heads. Wire springs are obtusely bent to form central horizontal portions and two outward sloping legs. Loops are formed at the apexes of legs and bodies, and staples are passed through the loops and around pendants to fix the springs thereto. Longitudinal edges of flat upper surfaces of the pusher dogs are grooved to receive free ends of the wire springs.

The pusher dogs, springs and clips of the present invention are readily assembled on a drive chain pendant. Wire springs are placed on opposite sides of the pendant and a staple is passed through the four loops and clinched to the pendant. The clips are placed within the dogs and are pushed upward on the pendant, and the clips are riveted to the pendant. Ends of the springs are placed in the groves provided, and the apparatus is ready for use. Damaged or worn pusher dogs may be removed from pendants simply by punching out the rivets which hold the clips on the pendants.

The integral cast pusher dogs are far superior to known pusher devices. The dogs are easily attached to existing drive chains, and the mounting means are permanent until removal is required. The entire apparatus is connected to a drive chain using rivets and staples. Wire springs offer economy and reliability, and the interconnection of the wire springs, pendants and dogs disclosed herein offers advantages heretofore unattainable.

One objective of this invention is the provision of improved combined pusher dog retaining clips and spring apparatus for use on drive means of power and free conveyor systems.

Another objective of this invention is the provision of improved integrally cast pusher dog apparatus.

This invention has as a further objective the provision of wire springs having medial mounting loops for overriding pusher dogs.

Further objectives of this invention will be apparent from this specification, which includes the claims, and from the drawings.

DETAILED DESCRIPTION OF THE DRAWINGS

Figure 1:
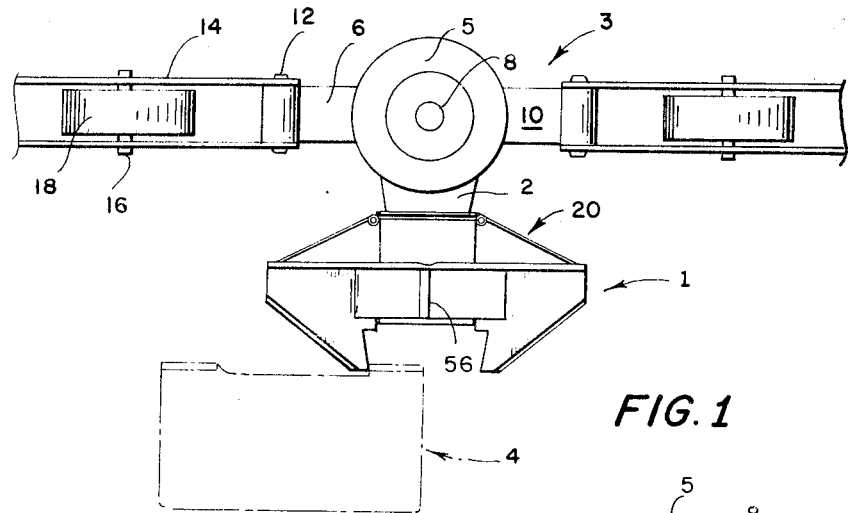
FIGURE 1 is a side elevation of an overriding pusher dog mounted on a pendant of a conveyor chain, with the pusher dog in a trolley engaging position showing the trolley in phantom view and showing a section of chain to which the dog is attached.

Referring to the drawings, overriding pusher dog apparatus 1 is mounted on a pendant 2 extending from drive chain 3 in the direction of trolleys 4. Drive chain 3 rides in a track on vertically oriented wheels 5, L-shaped link members 6, which have pendant means 2 extending toward trolleys 4 are mounted on axles 8 of wheels 5. Clevis ends of universal members 10 also are mounted on axles 8. Opposite ends of universal members 10 and L-shaped link members 6 receive vertical pins 12, which in turn hold horizontal link plates 14. Horizontal wheels 18 freely rotate on vertical axles 16, which span intermediate portions of link plates 14.

Figure 2:
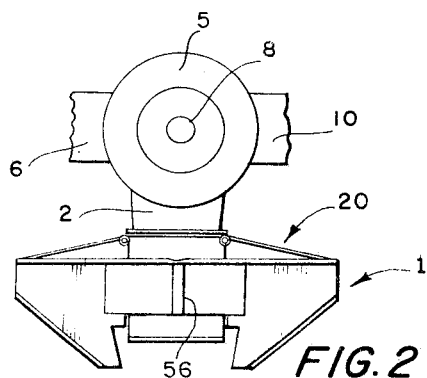
FIGURE 2 is a side elevation of the pendant-mounted dog in an upward, disengaged position.

As shown in FIGURE 1, pusher dog 1 is urged downward by springs 20 into driving engagement with trolley 4. When a stopped trolley is approached pusher dog 1 is cammed upward against the force of spring 20, as illustrated in FIGURE 2.

Figure 3:
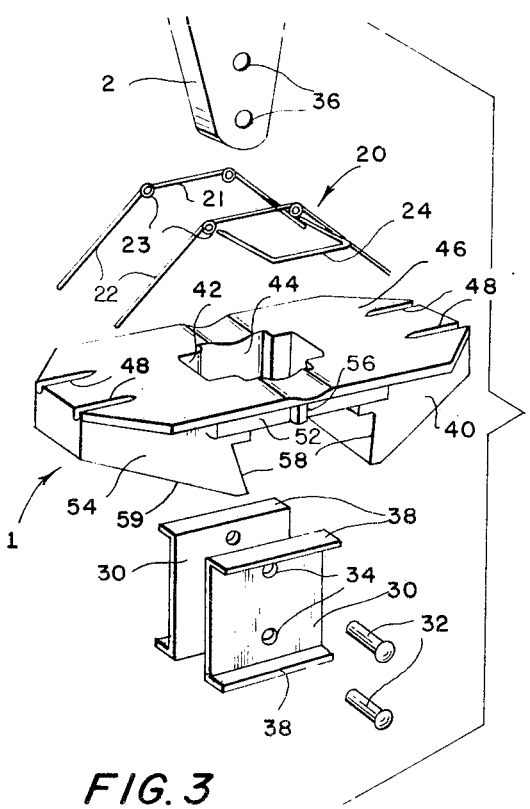
FIGURE 3 is an exploded detail of a pusher dog.
Figure 4:
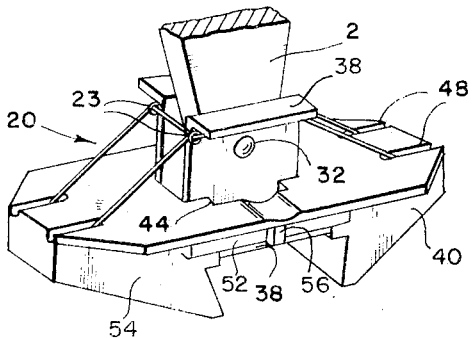
FIGURE 4 is an assembled detail of an overriding dog.

As shown in more detail in FIGURES 3 and 4 springs 20, which have central portions 21, legs 22 and loops 23 are attached to chain pendants 2 by inserting a staple 24 through the loops and bending the staple about the pendant. Clips 30 are inserted in the central opening 42 of block 40. The block and clips are pushed on the pendant, and rivets 32 are inserted through holes 34 in clips 30 and holes 36 in pendant 2. Horizontal flanges 38 along upper and lower edges of clips 30 limit vertical movement of block 40 with respect to pendant 2.

Block 40 is a unitary casting, having a central opening 42 which has recesses 44 at the sides to permit passage of heads or rivets 32. A flat upper plate portion 46 of blocks 40 is beveled at opposite ends. In longitudinal ends of upper portion 46 are parallel grooves 48, which receive free ends of spring legs 22.

Reinforcing portions 52 are constructed on opposite faces of block 42; spanning opposed trolley-engaging portions 54. Pusher dog indicating means 56 project outward from reinforcing portions 52. The function of the indicating means 56 is to provide surfaces which may be sensed by devices which are positioned along a track to sense positions of pushers.

Inner and outer faces 58 and 59 of trolley-engaging portions 54 are sloped downward and inward. Inner faces 58 are sloped complementarily to pusher dog engaging elements on trolleys 4 so that the cooperating slopes tend to move the pusher blocks toward the trolleys, when in driving engagement. That feature is especially significant when moving or holding trolleys on a grade. Outer faces 59 are sloped to facilitate the camming of pusher dogs up and over obstructions and stopped trolleys. Blocks 40 and slopes 59 are sufficiently long, and pusher-engaging elements on trolleys are sufficiently close to leading ends of trolleys so that blocks 40 will lift over trailing ends of stopped trolleys before moving trolleys are driven against stopped trolleys.

The improved springs, limit clips mounting means and pusher block of the overriding dog disclosed herein provide improved and prolonged operation as compared with related apparatus in previously known power and free conveyor systems.

Although this invention has been described in a specific embodiment, to those skilled in the art other embodiments will be obvious from the disclosure. This invention is exemplified by but not limited to the apparatus shown in the drawings and described in the specification. Precise limits of this invention are found only in the appended claims.

I claim:
1. Overriding pusher dog apparatus comprising:
pendant means extending outward from drive means,
first and second limit means mounted on the pendant means and extending outward therefrom, the first limit means being positioned near an end of the pendant means remote from the drive means, and the second limit means being positioned medially on the pendant means,
pusher block means having a central opening mounted on the pendant means between the first and second limit means, and the pusher block means having grooves in a portion thereof facing the second limit means,
first and second spring wire means having central portions terminating in opposite loops, the central portions being mounted on opposite sides of a medial portion of the pendant means, having leg portions extending from the loops to the pusher block means at obtuse angles to the central portions, and having free end portions contacting the pusher block means and extending into the grooves therein for urging the pusher block means toward the first limit means.

2. The overriding pusher dog apparatus of claim 1 further comprising first and second clip means riveted on opposite sides of the pendant means adjacent an end thereof remote from the drive means, wherein the first and second limit means comprise flanges extending outward from longitudinal ends of the clip means, and wherein the pusher block means defines a central opening recessed at opposite sides thereof for providing passage over rivets in clip means.

3. The apparatus of claim 1, wherein the pusher block comprises:
an integrally cast body having
an elongated upper plate portion,
first and second trolley-engaging portions integrally formed and longitudinally spaced on one side of the plate portion, the plate portion defining a rectangular central opening aligned with a space between trolley engaging portions.

4. The apparatus of claim 3 wherein opposite sides of the central opening are recessed.

5. The apparatus of claim 3 wherein a side of the plate portion remote from the trolley engaging portions defines parallel grooves in a longitudinal direction of the plate portion.

6. The apparatus of claim 5 wherein the parallel grooves extend partially inward from opposite longitudinal edges of the plate portion.

7. The apparatus of claim 3 wherein the plate portion is beveled intermediate longitudinal and lateral edges thereof.

8. The apparatus of claim 3 further comprising integrally formed spaced reinforcement portions overlying opposite sides of the trolley engaging portions adjacent the plate portion.

References Cited
UNITED STATES PATENTS 1,430,249  9/1922  Morse _____ 267—108
3,353,500  11/1967  Orwin _____ 104—172

ARTHUR L. LA POINT, Primary Examiner
R. W. SAIFER, Assistant Examiner

U.S. Cl. X.R.
107—178